UNITED STATES PATENT OFFICE.

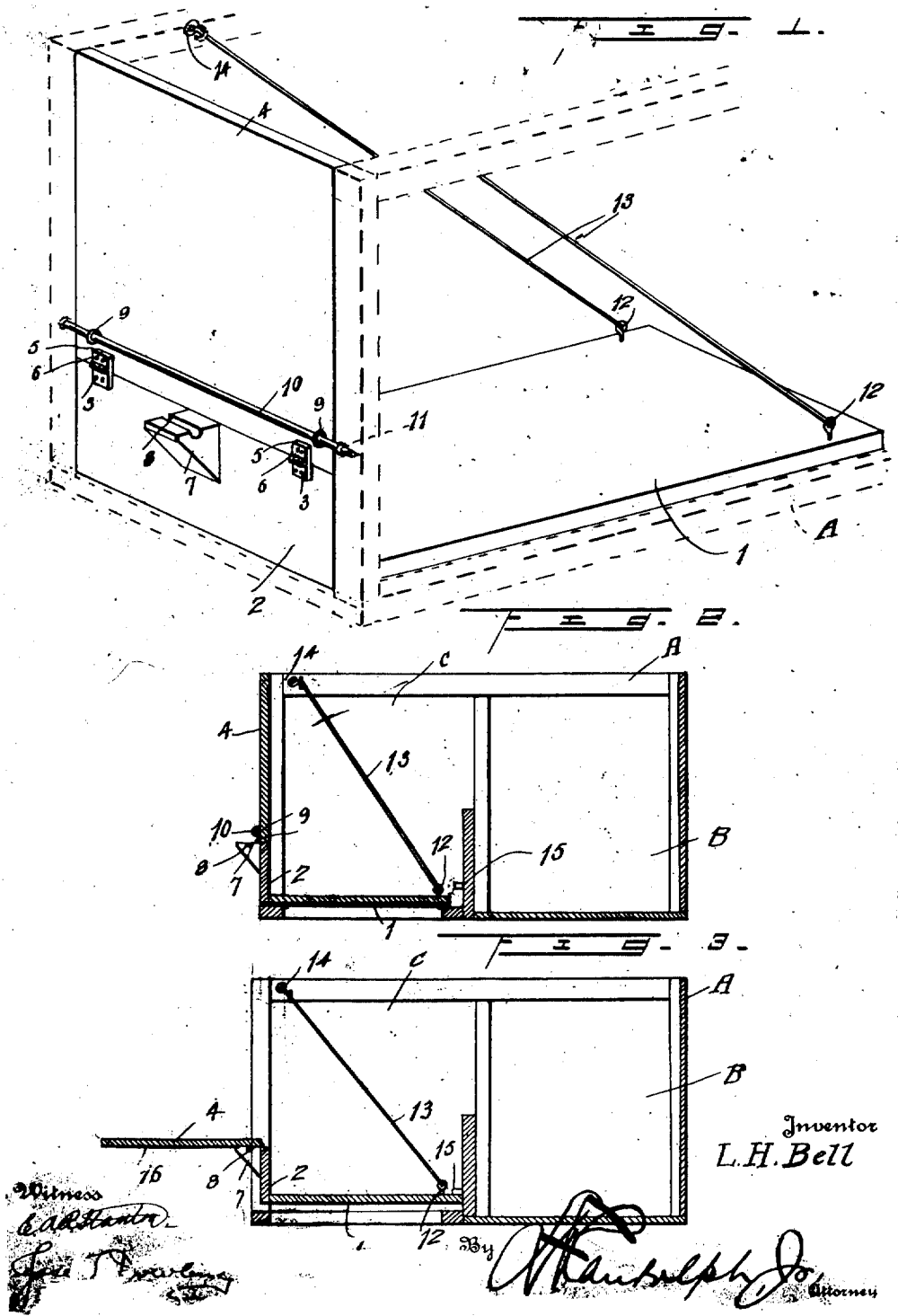

LUCIUS H. BELL, OF FORT DODGE, IOWA.

TRAP-NEST.

1,251,327.  Specification of Letters Patent.  Patented Dec. 25, 1917.

Application filed March 13, 1917. Serial No. 154,506.

*To all whom it may concern:*

Be it known that I, LUCIUS H. BELL, a citizen of the United States, residing at Fort Dodge, in the county of Webster and State of Iowa, have invented certain new and useful Improvements in Trap-Nests; and I do hereby declare the following to be a full, clear, and exact description of the invention, such as will enable others skilled in the art to which it appertains to make and use the same.

This invention relates to improvements in traps for poultry nests.

The object of this invention is the provision of a device especially adapted to be applied to the type of nest now on the market which is so constructed as to provide a device whereby the nest may be automatically closed by the hen when she steps upon the device inclosing her therein.

A still further object of this invention is the provision of a nest having applied thereto my improved trap which is so constructed that it will be automatically closed when the hen steps on the trap and she cannot get out of the nest until the attendant lifts the door and resets it. It will also be seen that it has no locks or triggers to get out of order yet by proper balancing of the door and treadle it can be so delicately adjusted that a weight of less than a half pound on the treadle will spring the trap.

A still further object of this invention is the provision of a trap adapted to be applied to a well known type of nest and it comprises a treadle having hingedly secured thereto a door. The door is journaled to the frame of the nest and the treadle carries a stop which engages the bar upon which the door is journaled. The device is set and upon a hen stepping upon the treadle the door will be automatically closed preventing the hen from getting out of the nest until an attendant opens the door and resets the trap.

A still further object of this invention is the provision of a trap of this character, which will be simple, practical and comparatively inexpensive in construction and one that can be manufactured and sold at a small cost.

With these and other objects in view the invention consists in the novel combination and arrangement of parts hereinafter more fully described and set forth in the claims hereto appended.

In the drawings:

Figure 1 is a perspective view of my improved trap as applied to a nest frame which is herein illustrated in dotted lines.

Fig. 2 is a longitudinal view taken through a nest illustrating the trap applied thereto and in closed position, and Fig. 3 is a longitudinal sectional view through a nest illustrating the trap applied thereto and in open position.

Like numerals of reference designate corresponding parts in all the figures of the drawings.

Referring more particularly to the drawings the letter A designates the frame of the nest as illustrated in dotted lines to illustrate the manner in which my improved trap is to be applied thereto.

My improved trap comprises in its construction a treadle platform 1 which has its forward end provided with a right angular extension 2 which has secured to its upper longitudinal edge adjacent each end thereof one end of the hinges 3. A rectangular door 4 has its lower longitudinal edge secured to the upper portion of the hinge 5 as at 6 thus hingedly securing the door to the right angularly arranged extension 2 of the treadle 1.

A substantially triangular stop member 7 is secured by one face to the outer face of the extension 2 intermediate the ends thereof and having its upper face flush with the upper longitudinal edge of the extension, the upper face is provided with a transversely arranged groove 8 the purpose of which will be hereinafter more fully described. The stop 7 also constitutes a handle whereby the door and treadle may be set for operation.

A pair of eye brackets 9 are secured to the front face of the door at the lower longitudinal edge thereof and adjacent each side edge thereof these brackets are adapted to have removably and rotatably mounted therein a rod 10 which rod has its opposite ends removably journaled in eye brackets 11 carried on the posts of the frame A as clearly illustrated in Fig. 1.

Secured to the upper face of the treadle 1 adjacent the rear edge thereof and near each side longitudinal edge are the upstanding eye bolts 12 which have secured therein by one end the guide wires 13 which guide wires have their opposite ends secured as at 14 to the frame A thus it can be seen that the treadle and door are equalized on the bar 10 when in open position, the guide wire 13 reinforcing and supporting the rear edge of the treadle in raised position.

When applying the device in use:

The ordinary nest is provided with the frame A having the nest compartment B and a compartment in which the trap device is arranged and designated C, secured to the frame A and in the compartment C are the stop lugs 15 which are in the path of the rear end of the treadle 1, the treadle is arranged in the compartment C and the door closing the open end thereof, the bar 10 is arranged transversely through the eyes 11 and 9 thus journaling the door and treadle to the frame A, the guide wires 13 are secured by one end to the eyes 12 of the treadle and their opposite ends secured to the frame as at 14 the door then is drawn downwardly until the bar 10 rests within the groove 8 of the stop 7 thus the door is in a horizontal position as indicated as at 16 in Fig. 3 of the drawings and when the door is in a horizontal position the treadle 1 is slightly raised engaging the stop blocks 15 and the device is ready for use. A hen on entering the compartment C jumps upon the door 4, enters into the compartment C and jumps upon the treadle 1, upon the weight of the hen on the treadle 1 the same will automatically close the door 4 and prevent the hen from getting out of the nest until an attendant opens the door and resets the trap.

What is claimed is:

1. A trap for poultry nests comprising a treadle, a door hingedly secured to the treadle, a stop carried by the treadle, a bar journaled to the door and engaging the stop limiting the opening movement of the door, guide wires carried by the treadle, as and for the purpose specified.

2. A trap for hens' nests comprising a rectangular treadle, a right angularly extending extension formed on one end of the treadle, a door hingedly secured to the upper edge of said extension, a stop carried by the extension, a bar journaled to the door and adapted to engage the stop for limiting the opening movement of the door with relation to the treadle, guide wires carried by the treadle and said bar adapted to journal the door and treadle to a support, as and for the purpose specified.

3. A trap for hens' nests comprising a rectangular treadle, an extension formed on one end of the treadle and arranged at right angles thereto, a rectangular door hingedly secured to the upper edge of the extension, a triangular stop secured to the outer face of the extension intermediate the ends thereof constituting a handle, a bar removably carried by the door and adapted to engage the stop for limiting the outward movement of the door with relation to the treadle, said bar adapted to journal the door and treadle to a support, and guide wires carried by the treadle and engaging the support for holding the rear end upwardly.

4. In combination with a support having side, top and bottom walls, and a rear wall having its front side fully open, a trap therefor, said trap comprising a treadle and located in the open end of the support, a door hingedly secured to the extension for closing the open end of the support, a stop carried by the extension, bearing eyes carried by the door, bearing eyes carried by the support, a rod rotatably mounted in the bearing eyes of the support and door for journaling the door thereto, said bar adapted to be engaged by the stop carried on the extension for limiting the outward movement of the door, guide wires carried by the treadle and engaging the support for holding the rear end upwardly, lugs carried by the support and in the path of the treadle, said door adapted to raise the treadle when in open position, said stops limiting the upward movement of the treadle, said door adapted to be automatically closed upon pressure applied to the treadle.

In testimony whereof I affix my signature in presence of two witnesses.

LUCIUS H. BELL.

Witnesses:
J. L. PORTER,
M. P. McDERMOTT.